(12) United States Patent
Chiang et al.

(10) Patent No.: US 11,589,205 B2
(45) Date of Patent: Feb. 21, 2023

(54) EMERGENCY SESSION TRANSLATION AND TRANSCRIPTION VIA AUDIO FORKING AND MACHINE LEARNING

(71) Applicant: T-Mobile USA, Inc., Bellevue, WA (US)

(72) Inventors: Hsin-Fu Henry Chiang, Bellevue, WA (US); Yasmin Karimli, Kirkland, WA (US); Syed Toaha Ahmad, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 238 days.

(21) Appl. No.: 17/131,587

(22) Filed: Dec. 22, 2020

(65) Prior Publication Data

US 2022/0201456 A1   Jun. 23, 2022

(51) Int. Cl.
*H04W 4/90* (2018.01)
*G06F 40/40* (2020.01)
*H04L 12/18* (2006.01)
*H04W 76/15* (2018.01)

(52) U.S. Cl.
CPC ............. *H04W 4/90* (2018.02); *G06F 40/40* (2020.01); *H04L 12/1813* (2013.01); *H04L 12/1859* (2013.01); *H04W 76/15* (2018.02)

(58) Field of Classification Search
CPC ... H04W 4/90; H04W 76/15; G06F 40/40–58; H04L 12/1813; H04L 12/1859; H04L 51/066; H04L 51/10
See application file for complete search history.

(56) References Cited

U.S. PATENT DOCUMENTS

2014/0162582 A1*  6/2014  Daly .................... H04W 76/50
                                                      455/404.1
2018/0089179 A1*  3/2018  Baker .................... G06F 40/47

* cited by examiner

*Primary Examiner* — Ronald Eisner
(74) *Attorney, Agent, or Firm* — Lee & Hayes, P.C.

(57) ABSTRACT

Techniques for enabling real time translation and transcription services between users that have contacted emergency services and PSAP operators who are coordinating the emergency services are discussed herein. For example, a system determines that the user and the PSAP operator speak different language, are unable to effectively hear each other, or are otherwise struggling to communicate effectively. The system can determine that an augmentation of the communication session is to be provided and can initiate translation or transcription services via network edge computing resources. The network edge computing resources are configured to generate the augmented communication data and enable the communication network to merge the augmented communication data and the original communication data in real time.

8 Claims, 7 Drawing Sheets

EMERGENCY SESSION TRANSLATION AND TRANSCRIPTION VIA AUDIO FORKING AND MACHINE LEARNING

BACKGROUND

Computers, cellular phones, and other electronic devices have become ubiquitous in society today. The combination of the Internet, cellular technologies, and modern electronics, among other things, has created an explosion in the number and types of electronic devices available (e.g., cellular phones, smart phones, tablets, laptops, etc.) and how the electronic devices are utilized in day to day life. Alongside the development in mobile devices, an enhanced 911 (E911) service was developed to service emergency communications with the array of available devices. Increasingly, users rely on smart phones and other electronic devices during communications with each other and with emergency services.

Emergency communication sessions generally prioritize different quality of service (QoS) indicators compared to enterprise or consumer communication sessions. For instance, effectively conveying information between an individual and the emergency service operator is commonly one of if not the top priority for the emergency communication session. Additionally, enhanced 911 (E911) services enable an individual to dial 911 and be connected to the appropriate emergency services regardless of location, utilize video during emergency calls, and additional functionality that is enabled by modern communications. However, current emergency service communication sessions utilize a communication network to transmit and receive data generated by a user device and a public safety answering point (PSAP).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
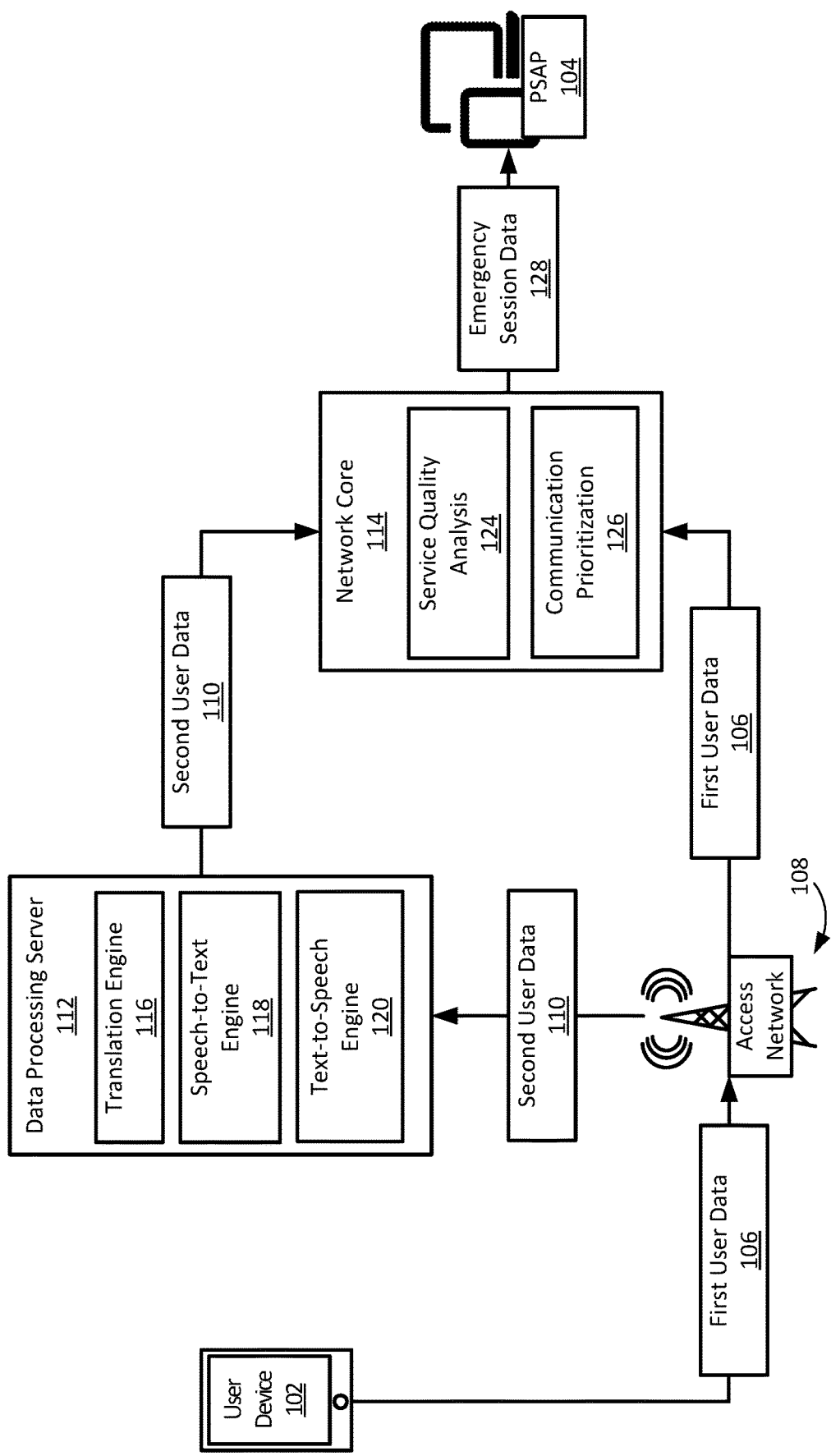
FIG. 1 depicts a communication network configured to provide substantially real time augmentation services and data processing for an emergency communication session between a user device and a public safety answering point (PSAP).

This disclosure generally relates to and describes systems, methods, and techniques for generating additional data streams that augment a communication session with additional content. In particular, emergency communication sessions can be augmented with additional data streams that contain translated audio, speech-to-text (STT) information, text-to-speech (TTS) information, and additional data for ensuring effective communication between a caller and an emergency services operator/Public Safety Answering Point (PSAP). Additionally, the additional content can be generated in real-time and transmitted parallel to or alongside audio and/or video data streams. Additionally, the generated data stream(s) can be utilized to augment individual comprehension in scenarios where communication of information is of the highest priority, such as during emergency calls or enhanced 911 (E911) calls. The communication session can be associated with either local computing resources and/or edge computing resources that analyze the transmitted data, generate STT information and/or audio translation in real time, and combine the generated data stream(s) with the audio data stream and/or the video data stream.

Additionally, this disclosure describes methods and systems associated with a communication network that are configured to ensure or attempt to ensure that information is effectively transmitted between a user device and a PSAP. In particular, the communication network can be configured to monitor quality of service (QoS) indicators and modify transmitted data to transmit one or more priority data transmissions with preference over one or more additional data transmissions. The one or more priority data transmissions can be associated with various data types that are associated with important information, reduced bandwidth requirements, and/or other factors that Further, this disclosure is directed to systems and methods for managing a communications line that is shared between an owner of the communications line and a user/borrower of the communications line. In particular, the user can be associated with a first user ID. Similarly, the owner can be associated with a second user ID. Additionally, a network node can be configured to determine that the first user ID and/or the second user ID are associated with the communication line. Further, the network node can determine that first user information associated with the user and second user information can be associated with the owner. Accordingly, where the owner has issued a grant access or other command permitting the user to access and utilize the communication line, the first user data can be associated with the first user ID such that the user receives communications via the communication line while the owner of the communication line does not receive the communications.

In at least one example, a user can initiate a communication with a PSAP and be connected with the PSAP via a communication network. However, the communication network can determine that the user is speaking and/or understands a first language that is different than a second language that is associated with the PSAP. In particular, the communication network can determine that the user is speaking a different language than the language utilized by the PSAP based at least on initial audio and/or video data generated by the user, based at least on previous communication sessions associated with the user, and/or based at least on internal user device settings associated with the user. Additionally, the communication network can determine that the PSAP utilizes a different language than the language spoken and/or understood by the user based at least on a predominately utilized language associated with a location of the PSAP, based at least on stored communication data associated with the PSAP and/or individual operators of the PSAP, and/or based at least on language indications that are provided by the PSAP. Further, and based at least on the determination that the first language associated with the user is different than the second language associated with the PSAP, the communication network can flag the communication session for real time translation services to facilitate conversation between the user and the PSAP. Accordingly, audio data and/or video data associated with the communication session can be split a plurality of data streams, wherein individual data streams can be processed to provide translations between the first language and the second language, augment the communication session to ensure effective communication, and otherwise facilitate communication between the user and the PSAP.

In at least one additional example, a user can initiate a communication with a PSAP and be connected with the PSAP via a communication network. However, the communication network can determine that the user in an environment where audio communication may be difficult and/or inadvisable. In particular, the communication network can be configured to identify when the user is in a location that has a high level of ambient noise, is in a situation where speaking or listening to someone would be potentially dangerous, is providing aid in a manner that causes audio communication to be difficult, and/or is prevented from effectively communicating exclusively via audio communications. Additionally, the communication network can be configured to produce augmented communication data from audio data and/or video data transmitted by the user and/or the PSAP that facilitates communication between the user and the PSAP. Accordingly, the communication network can augment the communication session between the user and the PSAP to ensure/facilitate communication in a variety of communication environments.

In some examples, the methods and techniques that are described herein can be performed by network edge computing resources. In particular, access networks of the communication network can be associated with network edge computing resources that can be utilized to process incoming audio data and/or incoming video data and generate augmented data for a communication session. Additionally, the network edge computing resources can be further utilized to identify that augmented data is to be generated for the communication session based at least in part on QoS indicators, determinations that users and PSAP operators utilize different languages, determinations that individual data types are to be avoided or deprioritized. In some additional examples, the network edge computing resources can be further associated with a user profile database that stores user language parameters that may modify voice recognition algorithms utilized during translation and transcription of the speech of the user. In particular, the user language parameters can be configured to modify the voice recognition algorithms to more effectively analyze a user accent, user speech characteristics, user syntax characteristics, and other structural characteristics of the speech of the user. Accordingly, the network edge computing resources can enable substantially real time generation of translated text data, translated audio data, modified video data, Text-to-Speech (TTS) data, Speech-to-Text (STT) data, and other augmentations of the communication session between the user and the PSAP.

In some examples, a user device can be configured to partially or completely perform translation and/or transcription services for the communication session between the user and the PSAP. In particular, the communication network can be configured to cause the user device to complete translation and/or transcription tasks for the communication session based on the communication network determining that the user is speaking in a first language while the PSAP utilizes a second language. Additionally, when the communication network detects a difference in utilized languages, the communication session can be associated with translation of speech between the user and the PSAP and the communication network can transmit an indication that user speech is to be translated from the first language to the second language by the user device. Further, the user device can be caused to perform similar operations as those described with respect to the network edge computing resources discussed above. Accordingly, user devices with sufficient computation resources can enable substantially real time generation of translated text data, translated audio data, modified video data, TTS data, STT data, and other augmentations of the communication session between the user and the PSAP.

In some examples, communication session data generated by the user device and/or the PSAP can be forked, split, copied, and/or otherwise manipulated to produce a plurality of substantially identical data stream and/or packets. The plurality of data packets can be utilized to distribute augmentation processes performed by the communication network and enable augmentation of the communication session independent of user device capability and/or PSAP capability. This can include translation augmentations, transcription augmentations, video augmentations, TTS generation, STT generation, production of subtitles, and/or other processes for enhancing communication between the user device and the PSAP. Translation augmentations can be generated by dedicated translation servers configured to receive communication data in a first language and output the communication data in a second language. Similarly, transcription augmentations can be generated by dedicated transcription servers configured to receive communication data in a first data format and output the communication data in a second data format (e.g., audio data transcription to text data). Alternatively, or in addition, the communication data can be transmitted to a general data processing server that is configured to generate one or more augmentations from the communication data.

In some examples, machine learning algorithms may be utilized during translation and/or transcription operations to ensure effective analysis of audio data received from a user (or a PSAP operator) associated with a user device (or a PSAP). In particular, machine learning algorithms can enable the translation and/or transcription operations to utilize historical user data to generate speech parameters and accent data based on speech patterns of the user (or the PSAP operator). The historical user data can be gathered during previous emergency calls, standard communication sessions, and/or other user activities that involve recorded user speech (e.g., TTS operations where the user speaks to generate text and optionally corrects the generated text). Additionally, some or all of the historical user data can be analyzed to identify audio characteristics that can be utilized to generate the speech parameters and accent data for incoming user data (e.g., graded data sets can be utilized to train a machine learning algorithm to recognize the audio characteristics and generate the speech parameters/accent data from the audio characteristics). Further, the machine learning algorithms can be configured to identify user specific speech parameters and accent data that enables more accurate translation and/or transcription of the audio data received from the user during emergency calls. The speech parameters and/or the accent data can be stored by a user profile, utilized by the translation server and/or transcription server to analyze incoming user data, and can be updated by the machine learning algorithms based at least on the incoming user data.

In some additional examples, machine learning algorithms can be taught and/or configured to "hear" (e.g., receive audio data, parse the audio data, and generate potential response actions) and/or "see" (e.g., receive video data, analyze the video data, identify significant events from video data, generate potential actions based on video data) more clearly than the human ear and/or the human eye. In particular, a machine learning algorithm can be taught (e.g., reinforce desired actions based at least on graded input data that associates identified scenarios with preferred actions) to identify some scenarios and cause the translation and/or transcription servers to respond accordingly. For example, the machine learning algorithms can be configured to identify that a user is hiding based at least on received video data and determine that audio data is not to be provided for communication with the user. Instead, the machine learning algorithm can cause audio data received from the PSAP operator to be converted to text and displayed via the user device. Even without full autonomy, the various algorithms can be configured to guide the decision-making process of the PSAP operator by providing one or more response actions to the PSAP operator and/or first responders associated with the PSAP such that decisions can be made based on additional data than would otherwise be available and potentially in a shorter amount of time. Due to emergency situations often involving split second decisions and/or time sensitive decisions, reducing the amount of time utilized to make a decision can improve outcomes for the user attempting to receive help from the PSAP.

Currently, communication sessions between a user and a PSAP rely on the user and the operator of the PSAP to effectively communication critical information during an emergency situation. In particular, current emergency communication sessions provide a means for the user and the PSAP operator to communicate and coordinate emergency services. However, there are numerous situations where simply enabling the user and the PSAP operator to communicate is insufficient to ensure that emergency services are effectively provided. Differences in spoken languages, high pressure environments, noisy environments, time sensitive actions, variable communication network capacity, and other factors can hinder communication between the user and the PSAP. Additionally, as PSAPs gain additional capabilities, such as video calls (e.g., via e911 sessions), augmented communication session data can enable the communication network to ensure that information is effectively transmitted and received between the user and the PSAP during emergencies.

In some examples, data processing services and network cores can operate to augment and/or enhance emergency communication sessions between user devices and PSAPs within any network infrastructure including, but not limited to, third generation (3G), fourth generation (4G), fifth generation (5G), and future generations of networks. In particular, the data processing services can be integrated into 5G network infrastructures that utilize millimeter wave (mmW) data transmissions to reduce communication session latency to provide communication session augmentation data in substantially real time. However, while individual network infrastructures may be utilized to describe the functionality of the data processing services, other network infrastructure can benefit from the generation of augmented data for emergency communication session provided by network edge computing resources and distributed network computing resources.

In particular, a communication network can include additional access networks, network nodes, and network functions not discussed directly by this application. For example, the communication network can include 3G network infrastructure such as Serving GPRS Support Nodes (SGSNs), Gateway GPRS Support Nodes (GGSNs), and other associated network nodes and access networks. Similarly, the communication network can include 4G network infrastructure such as Packet Gateways (PGWs), Serving Gateways (SGW), Proxy Call Session Control Functions (PCSCFs), Mobile Management Entities (MMEs), and other associated network nodes and access networks. Additionally, the communication network can include 5G infrastructure such as User Plane Functions (UPFs), Session Management Functions (SMFs), Access Management Functions (AMFs), and other associated network nodes and access networks. While the communication network can utilize 3G, 4G, and 5G network infrastructure, the communication network is not limited to the illustrated examples and may utilize alternative network infrastructures including wireless local area networks, local area networks, wide area networks, digital subscriber line networks, and other types IP connectivity access networks (IP-CAN).

To simplify, the disclosure commonly refers to systems and methods for use with cellular phones. However, one skilled in the art will recognize that the disclosure is not so limited. While the augmentation of emergency communication sessions is useful in conjunction with cellular phones and video calling associated therewith, it should be understood that similar services can just as easily be provided for other network connected electronic devices, such as tablets, laptops, and personal computers. Although discussed in the context of an emergency call with a PSAP, the described techniques can be utilized anytime and in any context to ensure effective communication of information and/or that such communication between two parties is to be prioritized. Additionally, the system can provide the user with an enhanced experience and can enhance the user's ability to understand and communicate when making video calls. It should be noted that while the term "communication session" is used below, the described techniques can also be utilized for video calls, video calls between multiple callers (e.g., video conferences), audio calls, audio calls between multiple callers, and/or asymmetric communication sessions (e.g., where a first party is utilizing video and audio communication and a second party is utilizing video and text communication). Accordingly, communication sessions between two or more parties can be carried, for example, over internet connections, cellular connections, and even conventional land lines.

The terms "graphical user interface" (GUI) and "graphical user interface system" can be used herein interchangeably. These terms are used to denote a system that includes a GUI and the software and hardware used to implement the GUI and associated functionality. The systems and methods described hereinafter as making up the various elements of the present disclosure are intended to be illustrative and not restrictive. Many suitable systems, methods, and configurations that would perform the same or a similar function as the systems described herein are intended to be embraced within the scope of the disclosure.

FIG. 1 depicts a communication network configured to provide substantially real time augmentation services for an emergency communication session between a user device 102 and a public safety answering point (PSAP) 104. In particular, a user associated with the user device 102 can initiate an emergency communication session with the PSAP 104 and transmit first user data 106 via the communication network. Additionally, an access network 108 can receive the first user data 106 and generate second user data 110 that is transmitted to a data processing server 112. Similarly, the access network 108 can transmit the first user data 106 to a network core 114. The data processing server 112 can include data processing modules such as a translation engine 116, a transcription engine, a speech-to-text (STT) engine 118, and/or a text-to-speech (TTS) engine 120. Further, the network core 114 can include various network nodes and process the can be configured to provide a service quality analysis module 124 and a communication prioritization module 126. The network core 114 can receive the first user data 106 from the access network 108 and the second user data 110 from the data processing server 112 to generate emergency session data 128 and transmit the emergency session data 128 to the PSAP 104. It should be noted that while FIG. 1 describes data processing for user data generated by the user device 102, the communication network described by FIG. 1 can similarly provide data processing for PSAP data generated by the PSAP 104.

In some examples, a user device 102 can be any suitable computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a network digital camera, a global positioning system (GPS) device, and/or other similar mobile devices. Although this description may refer to the user device 102 as being "mobile" or "wireless," (e.g., configured to be carried and moved around), it is to be appreciated that the user device 102 may represent various types of communication devices that are generally stationary as well, such as televisions, desktop computers, game consoles, set top boxes, and the like. In this sense, the terms "communication device," "wireless device," "wireline device," "mobile device," "computing device," "terminal," "user equipment," and "user device" may be used interchangeably to describe a user device capable of performing the techniques described herein. In some examples, the user device 102 can have one or more capabilities that require a connection to a control function and/or a network core 114.

In some examples, the user device 102 and the data processing server 112 can be configured to communicate via an access network 108. It should be noted that the In particular, the access network 108 be selected from wireless modems (e.g., Wi-Fi, WiMax, Bluetooth, infrared signals, etc.), wired connections (e.g., ethernet, fiber-optic, DSL, broadband, etc.), telecommunication access networks (e.g., eNodeB, gNodeB, NodeB, radio access network (RAN), etc.), and/or other access technologies that enable the user device 102 to access the network core 114. Additionally, in some examples, the access network 108 can be associated with physical processing systems (e.g., servers) that are co-located with the access network 108. Alternatively, or in addition, the access network 108 can be remotely associated with the data processing server 112. Additionally, the access network 108 can be configured such that processing time for the first user data 106 transmitted from the access network 108 to the network core 114 is substantially equivalent to the processing time for the second user data 110 transmitted from the access network 108 to the network core 114 via the data processing server 112.

In some examples, a user can initiate a call to emergency services with a user device 102, causing a communication session to be formed by the network core 114 between the user device 102 and a PSAP 104. In particular, the user device can transmit a communication session request (e.g., such as a SIP invite or other communication session initiation message) that is transmitted via an access network 108 to the network core 114, causing the network core 114 to establish the communication session between the user device 102 and the PSAP 104. Additionally, the communication session request can include communication service parameters that detail communication services requested, user device details, and other relevant information to the communication session with the PSAP 104. The communication services can include audio data communication, video data communication, additional user devices to be included in the communication session, and other services provided by the communication network. Further, the communication session request can be configured to identify a user profile that is associated with the user device 102, language preferences for the user device 102, home network information for the user device 102, and general information associated with the user device 102. Accordingly, the network core 114 can receive the communication session request and establish a communication session between the user device 102 and the PSAP 104 that enables the user and a PSAP operator to communicate via audio data, video data, text data, and generated data associated with the communication session.

In some examples, once the communication session between the user device 102 and the PSAP 104 has been established, the user device 102 can generate first user data 106 based at least on audio captured in association with the user (e.g., words spoken by the user, ambient sounds from an environment of the user, background noises made by individuals around the user, etc.). Additionally, the user device 102 can generate first user data 106 based at least on video captured by a recording device of the user device 102 (e.g., a view of what the user is pointing the camera at, a close-up perspective of the face of the user, a view of the user recorded by another person, etc.). The data generated by the user device 102 (e.g., the audio data, the video data, etc.) can be encoded or otherwise prepared for transmission to the PSAP and transmitted to the access network 108 in association with the communication session. Accordingly, the user device 102 can generate first user data 106 and transmit the first user data 106 to the PSAP 104 as a part of the emergency communications between the user and the PSAP operator.

In some examples, the access network 108 can fork, split, copy, or otherwise generate second user data 110 from the first user data 106. It should be noted that while the application will primarily refer to the operation of generating the second user data 110 from the first user data 106 as "forking" the user data, the second user data 110 can be generated from the first user data 106 via any substantially lossless data duplication method. In at least one examples, the first user data 106 can be utilized to generate the second user data 110 with loss due to the access network 108 omitting header data associated with the first user data 106, the access network 108 generating the second user data 110 from the body of the first user data 106 (e.g., duplicating the actual audio data and/or video data generated by the user), the access network 108 omitting encryption data from the second user data 110, and/or the access network 108 otherwise reducing the overall size of the second user data 110. The generation of the second user data 110 with loss compared to the first user data 106 can enable lighter computation loads for the data processing server 112, reduce bandwidth requirements for the second user data 110, to prevent redundancy between actions performed by the access network 108 and the data processing server 112, and/or to otherwise improve the substantially real time generation of augmented data for the emergency communication session. Accordingly, regardless of whether lossless or loss methods are utilized, the first user data 106 can be forked (e.g., duplicated) to generate the second user data 110 for transmission to the data processing server 112.

In some examples, the user device 102 can be configured to fork the first user data 106 and generate the second user data 110. Similar to the above access network 108, the user device 102 can be configured to generate the second user data 110 based on the first user data 106 that is collected from the user. Additionally, the user device 102 can be configured to generate the second user data 110 in response to an indication that augmented data is to be generate for the emergency communication session. The second user data 110 can be generated in response to an indication that there are at least two languages associated with the communication session, that there are quality of service parameters that indicate augmented data can be generated to improve communication session quality, and/or other indications that augmented communication session data can improve information communication and/or coordination between the user and the PSAP operator.

In some examples, and independent of how the second user data 110 was generated, the second user data 110 can be transmitted to a data processing server 112. In particular, the data processing server 112 can include services such as a translation engine 116, a STT engine 118, and TTS 120. Additionally, the data processing server 112 can be configured to augment the second user data 110. For example, the data processing server 112 can utilize the translation engine 116 to translate a communication from a first language to a second language, wherein the first language can be associated with the user device 102 and the second language can be associated with the PSAP 104. Translation from the first language to the second language can be performed by receiving audio data of the second user data 110, utilizing the STT engine 118 to convert the spoken words of the audio data into encoded words in a text format (e.g., plain text, rich text, etc.). The encoded words can be in the first language and translated, by the translation engine 116, to generate second encoded words in the second language. In some additional examples, the second encoded words can then be converted, via the TTS engine 120, to second spoken words in the second language.

In some examples, the second user data 110 can be updated by the data processing server 112 to include the augmented data produced by the translation engine 116, the STT engine 118, the TTS engine 120, and/or other engines associated with the data processing server 112. In particular, the second user data 110 can be updated to include translated text that is associated with the audio data and video data of the first user data 106, translated audio that is associated with the video data of the first user data 106, translated audio data, translated text data, or other augmented data produced by the data processing server 112.

In some examples, the network core 114 can receive the first user data 106 from the access network 108 and the second user data 110 from the data processing server 112. In particular, the network core 114 can maintain the emergency communication session between the user device 102 and the PSAP 104. Additionally, the network core 114 can be configured to monitor the communication session between the user device 102 and the PSAP 104 to ensure that call quality is maintained and that communication date (e.g., audio data, video data, augmented data, etc.) is being transmitted between the user device 102 and PSAP 104. Further, the network core 114 can include a service quality analysis module 124 that is configured to determine, based at least on the network core 114 monitoring the communication data associated with the communication session and additional communication sessions within the network core 114, quality of service (QoS) indicators that can be utilized to determine the quality of communication session connections within the network core 114. It should be noted that the QoS indicators can be further utilized by the communication prioritization module 126 to determine whether the first user data 106 and the second user data 110 are to be further modified before transmission to the PSAP 104. Accordingly, the network core 114 can cause emergency session data 128 to be generated and transmitted to the PSAP 104 based on a selection of communication data (e.g., part or all of the first user data 106 and/or the second user data 110).

In some examples, the network core 114 and/or individual network nodes of the network core 114 (e.g., PGWs, SMFs, PCSCFs, UPFs, MMES, etc.) can be configured to monitor the communication session between the user device 102 and the PSAP 104, and other communication sessions utilizing the network core 114, to determine QoS indicators for at least the communication session. In particular, the network core 114 can be configured to identify issues such as excessive latency, packet loss associated with the emergency communication session, extended load times, high processing loads associated with the emergency communication session, and other indicators that communication between the user device 102 and the PSAP 104 is being hindered and/or interrupted.

Additionally, the network core 114 can be configured to identify utilization loads on gateways, transcoding cores, and other components of the network core 114 that are associated with the emergency communication session. Accordingly, the network core 114, or at least individual network nodes of the network core 114, can be configured to identify instances where the QoS for the emergency communication session is satisfies a minimum quality threshold and cause the emergency communication session to modify data types transmitted between the user device 102 and the PSAP 104. For example, the network core 114 can prevent video data from being transmitted to ensure that audio data is properly transmitted between the user device 102 and the PSAP 104 and prevent audio data from being transmitted to ensure that text data is properly transmitted between the user device 102 and the PSAP 104. Alternatively, or in addition, the network core 114 can cause augmentation data to be generated and prioritized for the communication session, such as generating audio data from video data generated by the user device 102 and/or text data from audio data generated by the user device 102. Accordingly, the data type utilizing fewer network resources can be prioritized for transmission between the user device 102 and the PSAP 104.

Figure 2:
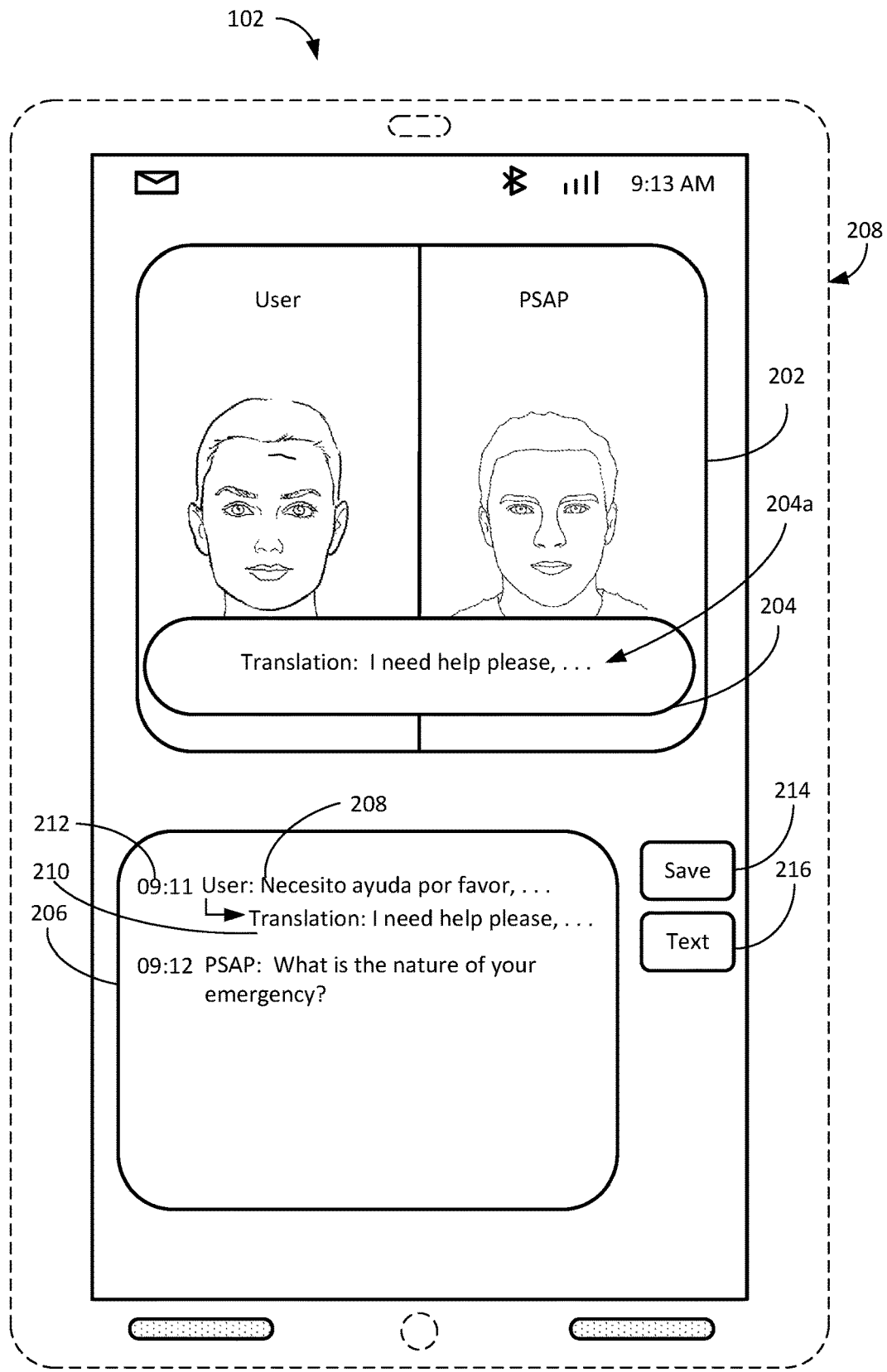
FIG. 2 depicts a system for enhanced emergency communication sessions that can be augmented with video data, translation services, and subtitles in accordance with some examples of the present disclosure.

FIG. 2 depicts a system for enhanced emergency communication sessions that can be augmented with video data, translation services, and subtitles in accordance with some examples of the present disclosure. In particular, an enhanced user interface 202 can be configured to provide video of at least one of the user associated with the user device 102 or the PSAP operator associated with the PSAP 104 described above. The enhanced user interface 202 can be configured to provide video and/or audio data associated with the emergency communication session while optionally augmenting the emergency communication session with text information and translations. Additionally, a real time text (RTT) interface 204 can provide translated subtitles 204a for the current (or most recent) statement transmitted via the communication session in substantially real time and/or a call log 206 that records the statements exchanged by the user and the PSAP operator. The call log 206 can include recorded information of original user statements 208, translated user statements 210, and timestamp(s) 212 associated with the user statements and PSAP operator statements. Further, the enhanced user interface 202 may include additional features such as a save button 214 that causes the call log 206 to be recorded for future access and a text options 216 that enables the user to input text information for the communication session where the user cannot, will not, and/or opts not to audibly speak.

The enhanced user interface 202 can be configured to enable participants (e.g., the user and the PSAP operator) to utilize RTT or text messaging for conveying augmented information (e.g., translated speech, subtitles, etc.) during an emergency communication session. In particular, RTT enables text messages to be sent over the existing voice connection, along with the video and audio, in real time, or substantially real-time. Thus, generally as the user types, as the translation in generated from audible speech, and other augmented data is generated, the individual letters, words, and/or statements can appear in the enhanced user interface 202 at approximately the same time on the user device 102, the PSAP operator device, and any other user devices associated with the emergency communication session. Thus, the user and the PSAP operator can effectively transmit and receive information despite not speaking the same language and/or the user being unable to speak.

In some examples, however, transmitting individual letters, phonemes (e.g., individual phonetic sounds produced by a speaker that determine a meaning of a word), syllables, and/or words may be disruptive to the conversation and fragment the meaning that the user and/or the PSAP operator is attempting to express. In other words, if the user types three letters, and then the PSAP operator speaks, and then the user enters three more letters, the actual RTT message may become undecipherable because small portions of the RTT are interspersed with subtitles 204a from the call. To this end, in some examples, the system may hold the RTT until a complete statement is generated, until several words are able to be transmitted, and/or otherwise a meaningful amount of information can be transmitted to avoid partial comments appearing in the call log 206. In at least one example, a message can be held in a buffer until the user selects a transmit button or a send control, indicating they have finished typing their message. Thus, while this configuration behaves more like a standard text massage, it still utilizes the same connection as the video call.

Standard text messaging, on the other hand, which may be sent over a separate data connection, can enable text messages to be sent when complete. This may be more conducive to the enhanced user interface 202 format in some examples, as it sends the whole message at the same time, rather than letter by letter. Thus, the user can select text control, input a message via the user device, and then select the text control (or a send control) to send the message over a parallel data connection. Independent of communication data input, the RTT messing, text messaging, TTS message, and/or other communication data input methods can enable the user to make a comment, ask a question, or otherwise participate in the call textually, with or without speaking. In other words, regardless of whether the user can hear or speak, the enhanced user interface 202 can be an effective and efficient way to communicate.

Thus, the user can select the RTT interface 204 and begin typing using a keyboard. As the user types, the entered text (or the entire text message) can appear almost instantly in the enhanced user interface 202. In other examples, as when using standard text messaging, for example, the text can appear in the enhanced user interface 202 when it arrives (usually within seconds of being sent). In some examples, the text can be inserted chronologically into the call log. In this manner, the text appears in the enhanced user interface 202 substantially as it occurs, which can provide a cadence and ease of communication similar to pure speech communication.

Regardless of whether the user selects the RTT interface 204 or the call log 206, the data can be carried in the same, or a separate, data stream depending on what technology handles the message (e.g., circuit switched (CS), internet protocol multimedia core network subsystem (IMS), etc.). So, for example, text, RTT, video, and audio can be on different media streams (i.e., different data connections with different destination points) in the same, or different, data pipe. RTT, audio, and video, for example, are commonly implemented on the same call in the same data pipe.

Figure 3:
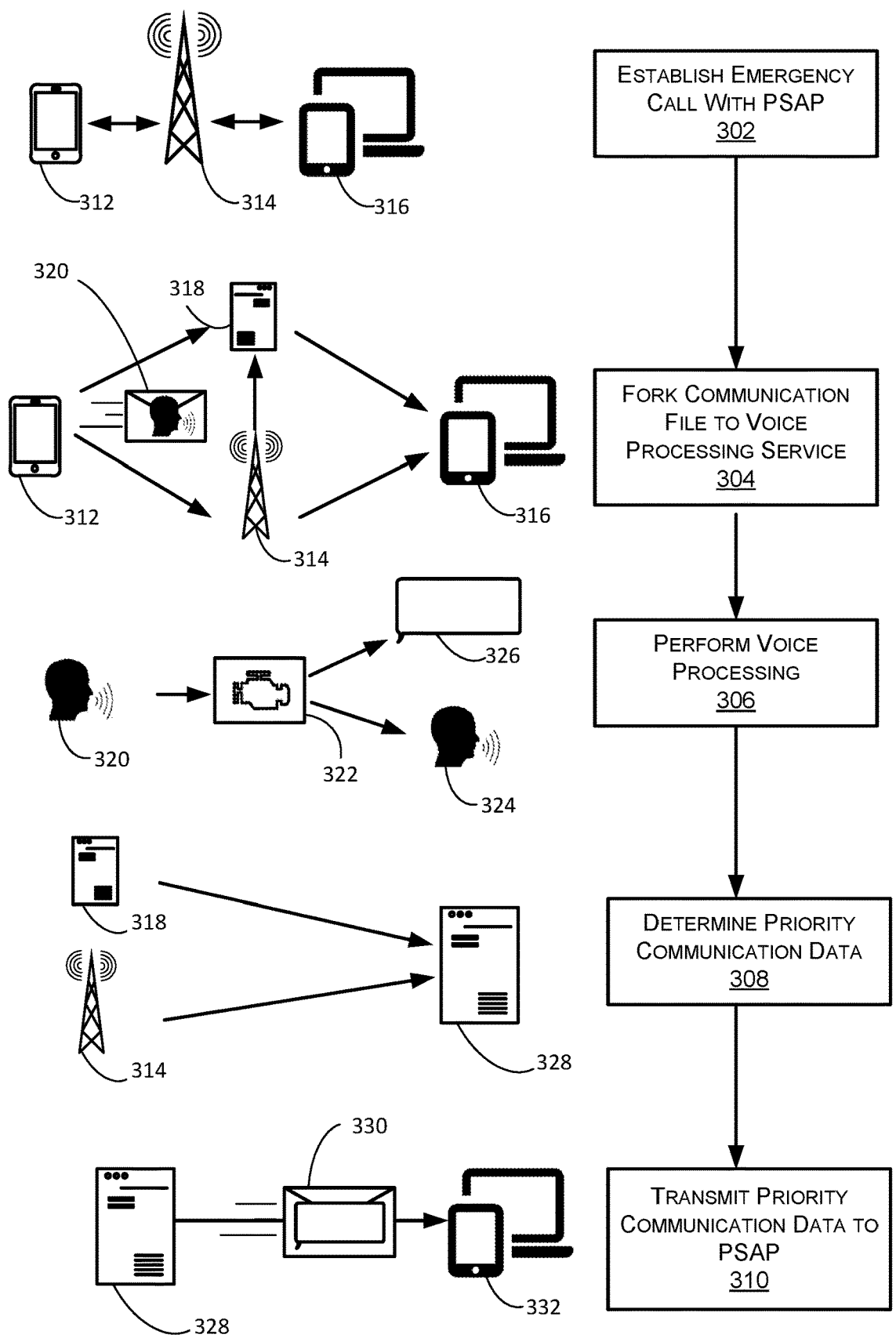
FIG. 3 depicts a flowchart describing a method for determining that augmented data is to be generated for an emergency communication session and identifying data processing resources to be utilized in generating the augmented data in substantially real time.

FIG. 3 is a flowchart describing a method for determining that augmented data is to be generated for an emergency communication session and identifying data processing resources to be utilized in generating the augmented data in substantially real time. In some examples, the process of generating augmented data can generally follow the steps of: establishing emergency call with PSAP 302, fork communication file to voice processing server 304, perform voice processing 306, determine priority communication data 308, and transmit priority communication data to PSAP 310. It should be noted that while the examples of FIG. 3 generally will follow the above workflow, it is to be anticipated that individual steps may be performed in a different order (e.g., determining priority communication data before voice processing) and/or include additional steps outside of the basic framework identified above.

At block 302, a user device 312 can call a PSAP 316 and establish an emergency communication session via at least an access network 314. It should be noted that in some examples, the PSAP 316 can also establish the emergency communication with the user device 312 through at least the access network 314 in scenarios where a callback is necessary due to a disconnection event or other event that causes a first communication session to be terminated. Independent of how the emergency communication session is established between the user device 312 and the PSAP 316, the emergency communication session can be configured to enable the transmission of video, audio, text data, and other data between the user device 312 and the PSAP 316 via a network core associated with the access network 314. Additionally, at least one user can be associated with the user device 312 and the user device 312 can be configured to record video data, record audio data, receive inputs that generate text data, and/or otherwise receive information from the user (or users) that is associated with the emergency communication session. Further, at least one PSAP operator can be associated with the PSAP 316 via a PSAP operator device (e.g., a user device associated with the PSAP operator). In some examples, a plurality of access networks can be associated with the emergency communication session, including the access network 314.

At block 304, a communication file can be forked to form two data streams associated with the communication session. A first data stream can be processed according to standard communication session protocols within the communication network. A second data stream can be transmitted to a voice processing service for augmented data generation.

In some examples, the access network 314 can receive communication data 320 from the user device 312 and redirect the second data stream, including the communication data 320, to a data processing server 318. In particular, the access network 314 can receive an indication from the user device 312 and/or from the network core that causes the access network 314 to redirect and/or fork the communication data 320 such that the second data stream is transmitted to the data processing server 318. Alternatively, or in addition, the access network 314 can determine that the communication data 320 is to be redirected and/or forked to transmit the second data stream to the data processing server 318. Independent of how the communication data 320 is transmitted to the data processing server 318, the communication data 320 can include audio data generated by the user and/or the PSAP operator, video data that depicts the user and/or the PSAP operator, and additional data related to the emergency communication session. It should be noted that the data processing server 318 can receive additional indicators from the user device 312, the access network 314, the PSAP 316, and/or the network core that describe voice processing services that are to be completed for the communication data 320.

In some additional examples, the user device 312 (or the PSAP 316 where the PSAP 316 is the originating point of the communication data 320) can transmit communication data 320 in a first data stream that is to be processed per standard procedures by the network core. Additionally, the user device 312 (or the PSAP 316) can transmit the communication data 320 in a second stream that is to be redirected and/or forked to the data processing server 318. Further, the user device 312 (or the PSAP 316) can transmit an indication of voice processing that is to be performed and/or of augmented data to be generated based at least on the communication data 320 by the data processing server 318. It should be noted that while the user device 312 (or the PSAP 316) can be configured to provide the communication data 320 and one or more indications related to how the communication data 320 is processed by the data processing server 318, additional indications can be provided by the network core. For example, while the user device 312 (or the PSAP 316) can provide the communication data 320 and an indication that the data processing server 318 is to generate translated audio data from the communication data 320, the network core can provide an indication that audio data of the communication data 320 is initially spoken in the Spanish language and is to be translated to the English language.

In some further examples, the communication data 320 can include the first data stream that is to be processed via standard procedures by the network core and the second data stream comprising augmented data associated with the first data stream. In particular, while the described systems can utilize network edge computing resources and/or distributed cloud computing resources (e.g., the data processing server (s) 318) associated with the communication network to generate the augmented data from the communication data 320, the user device 312 (or PSAP 316) can be configured to generate the augmented data from the communication data 320. Additionally, the user device 312 (or the PSAP 316) can receive indications from the communication network or the PSAP 316 (or the user device 312) indicating that augmented data is to be generated for the emergency communication session. For example, the user device 312 can receive an indication that the PSAP 316 utilizes the English language for coordinating emergency services during establishment of the emergency communication session and/or once the languages spoken by the user and the PSAP operate have been identified as being different. Accordingly, the user device 312 can utilize local processing resources to generate augmented data in substantially real time and transmit the augmented data either in parallel with the original communication data or in place of the original communication data.

It should be noted that the communication file 320 can be transmitted to the data processing server 318 (or to internal processing resources of the user device 312/the PSAP 316) at any point during the duration of the emergency communication session. In particular, due to the nature of emergencies, the environment of the user associated with the user device 312 may change during the call, may cause the behavior of the user to be modified, and/or other changes may cause the user to switch between language instinctively, may cause the user to suddenly utilize an accent due to a lapse in attention, may cause the user to no longer be able to speak, and/or otherwise modify the ability of the user to participate in the conversation. Similarly, the environment of the user device 312 may change to include more ambient noise, the quality of the communication session may degrade over time, and other external factors may cause the communication data 320 to be sent to the data processing server 318. Accordingly, such shifts can be detected by the user device 312, the PSAP 314, the network core, and/or other components of the communication network such that augmented data can be generated and presented in real time.

At block 306, voice processing can be performed by the data processing server 318 (or internal resources of the user device 312/the PSAP 316) to generate at least one of translated communication data 324 and/or text communication data 326. In particular, one or more processing engines 322 can be utilized to receive the communication data 320, analyze the communication data 320, and generate at least one of the translated communication data 324 and/or the text communication data 326. The one or more processing engines 322 can include a voice recognition module, a translation module, a STT module, a TTS module, and/or other modules associated with processing the communication data 320 and/or generating the augmented data for the emergency communication session.

In some examples, the data processing server 318 can receive one or more indications from the network core, the user device 312, the access network 314, the PSAP 316, and/or other network nodes that indicate augmented data that is to be generated from the communication data 320. In particular, the one or more indications can be generated in response to the network core (or other responsible device/ network node) determining that the communication data 320 generated by the user device 312 (or PSAP 316) is in a first language that is not associated with the PSAP 316 (or user device 312). Additionally, the network core can determine that the communication data 320 is to be translated from the first language to a second language that is associated with the PSAP 316 (or user device 312). Accordingly, the one or more indications can be transmitted to the data processing server 318 and cause the data processing server 318 to generate translated communication data 324 that contains the information of the communication data recorded in the second language.

In some additional examples, the data processing server 318 can receive one or more additional indications from the network core (or other device/network node associated with the communication network) that indicate augmented data is to be generated from the communication data 320. In particular, the one or more additional indications can be generated in response to the network core determining that the quality of service (QoS) associated with the emergency communication session satisfies a QoS threshold. The QoS threshold can represent a baseline QoS that is to be provided by the network core if a data type is to be utilized for the emergency communication session. For example, a video QoS threshold can identify a minimum bandwidth, a maximum latency, a maximum packet loss, and/or other network statuses that are to be satisfied if video communication is to be enabled for an emergency communication session. Similarly, an audio QoS threshold can identify similar network statuses that are to be within acceptable ranges if audio communication is to be enabled for an emergency communication session. Accordingly, where the QoS thresholds are satisfied (e.g., where the QoS statuses are not within acceptable ranges), the network core can cause the data processing server 318 to generate audio communication data where video communication is not permitted, to generate text communication data 326 where audio communication is not permitted, and/or otherwise generate communication data with less restrictive QoS thresholds so that a baseline QoS is maintained for the emergency communication session.

In some further examples, the data processing server 318 can receive one or more further indications from the network core (or other device/network node associated with the communication network) that indicate augmented data is to be generated based at least on audio indicators and/or video indicators associated with the communication data 320. In particular, the network core can identify, from the communication data 320, one or more audio indicators and/or one or more video indicators that can be utilized to determine that augmented data is to be generated by the data processing server 318. The one or more audio indicators can include large amounts of ambient noise not associated with the user, multiple speakers being recorded by the user device 312, and other audio indicators that cause the network core to request subtitles for the user device 312 and/or the PSAP 316.

Similarly, the one or more video indicators an include an environment recorded by the user device 312 that indicates the user is attempting to hide (e.g., the user being inside a dark environment with hanging coats or clothes may indicate the user is hiding in a closet and cause subtitles to be generated in case the user is hiding during an ongoing crime), an environment recorded by the user device 312 that indicates the user may not be able to actively listen to the PSAP operator (e.g., the user is utilizing a camera of the user device 312 to record an injured individual and sets down the user device 312 to attempt to provide rudimentary first aid based on PSAP operator instructions), and/or other visual indicators of scenarios where subtitles and/or other augmented data will assist the user and/or the PSAP operator. It should be noted that some video indicators and/or audio indicators can overlap, such as a video recording depicting numerous people surrounding the user and an audio recording indicating that there are high levels of ambient noise in the communication data 320. Accordingly, the network core can cause the data processing server 318 to perform voice processing and generate augmented data from the communication data 320.

In some examples, the data processing server 318 can utilize the one or more processing engines 322 to generate translated communication data 324 from the communication data 320. In particular, the data processing server 318 can receive an indication of at least two languages including a first language associated with the communication data 320 and a second language to be associated with the translated communication data 324. Additionally, the data processing server 318 can utilize a voice recognition engine and/or a STT engine to analyze received audio data and/or video data of the communication data 320 and generate a text representation of the communication data 320. From the generated text, a translation engine can generate translated text that is associated with the second language and the communication data 320.

In some examples, the translated text generated by the translation engine can be provided to the user device 312 for presentation to the user and/or the PSAP 316 for presentation to the PSAP operator such that the user/the PSAP operator is able to read the translated text in the second language while the PSAP operator/the user is speaking in the first language (e.g., the translated text can be provided as text communication data 326). In some additional examples, the translated text can be presented to the user/the PSAP operator in place of spoken audio. In some further examples, the data processing server 318 can cause a TTS engine to generate translated communication data 324 from the translated text such that translated audio can be provided for the user and/or the PSAP operate in place of the communication data 320, as supplementary data to the communication data 320, and/or in combination with the communication data 320. It should be noted that audio data utilized by the data processing server 318 to generate the translated communication data 324 can be obtained from parsing video data formats to obtain the audio data that is encoded into the video data.

In some additional examples, the data processing server 318 can receive an indication that text communication data 326 is to be generated to supplement and/or replace some or all of the communication data 320. In particular, and as noted above, the data processing server 318 can receive an indication that subtitles and other text representations of the communication data 320 are to be generated. Additionally, and in response to the indication, the data processing server 318 can utilize a voice recognition engine and/or a STT engine to generate the text communication data from the communication data 320.

At block 308, one or more network nodes 328 of the network core can receive a first data stream from the access network 314 comprised of the communication data and a second data stream from the data processing server 318 comprised of at least augmented communication data such as the translated communication data 324 and the text communication data 326. In particular, the first data stream and the second data stream (or first data packets and second data packets in examples where transmission of data is intermittent, inconsistent, opportunistic, and/or non-continuous) can be received by one or more network nodes 328 configured to maintain the emergency communication session and transmit data associated with the emergency communication session between the user device 312 and the PSAP 316. Additionally, the one or more network nodes 328 can be configured to determine, based at least on one or more QoS indicators, whether the communication data 320 and the augmented communication data are to be prioritized for transmission.

For example, available bandwidth for emergency sessions may be restricted during a large scale emergency such as an earthquake, a tornado, a riot, or other man-made or natural emergency. Accordingly, to ensure that the PSAP 316 is able to maximize the number of emergency calls being processed during the large scale emergency, the one or more network nodes 328 can determine that text communication data 326 is to be prioritized for transmission between the user device 312 and the PSAP 316. Alternatively, or in addition, the PSAP can transmit an indication that text communication data or exclusively audio communication data is to be transmitted between the user device 312 and the PSAP 316. It should be noted that such an indication or a determination can be utilized to cause the data processing server 318 to generate the augmented communication data as described in block 306.

In some examples, the one or more network nodes (or the network core) 328 can be configured to determine whether data received via the first data stream and the second data stream is to be analyzed for priority. In particular, the one or more network nodes 328 can be configured to determine whether individual data types (e.g., text, audio, video, etc.) within the first data stream and second data stream are to prioritized for transmission between the user device 312 and the PSAP 316. For example, where the network core determines that the user is speaking a first language while the PSAP operator speaks a second language, the transmission of translated text data can be prioritized over the untranslated audio data. Similarly, translated audio data can be prioritized over untranslated audio data.

At block 310, the one or more network nodes 328 can transmit the priority communication data to the PSAP 316 (or to the user device 312 in examples where the PSAP 316 generated the communication data 320 initially).

Figure 4:
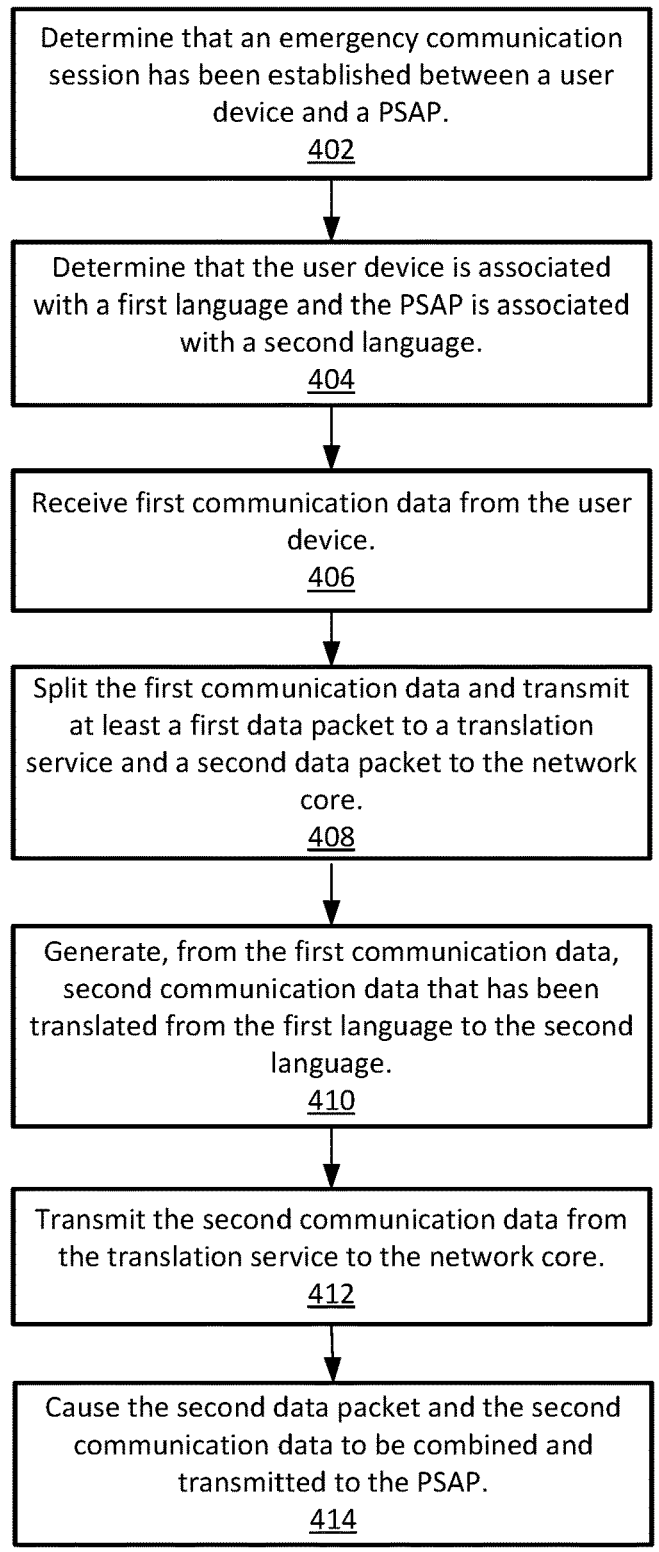
FIG. 4 is a flowchart describing a method for generating translated text communication data and/or translated audio communication data for an ongoing emergency communication session in substantially real time.
Figure 5:
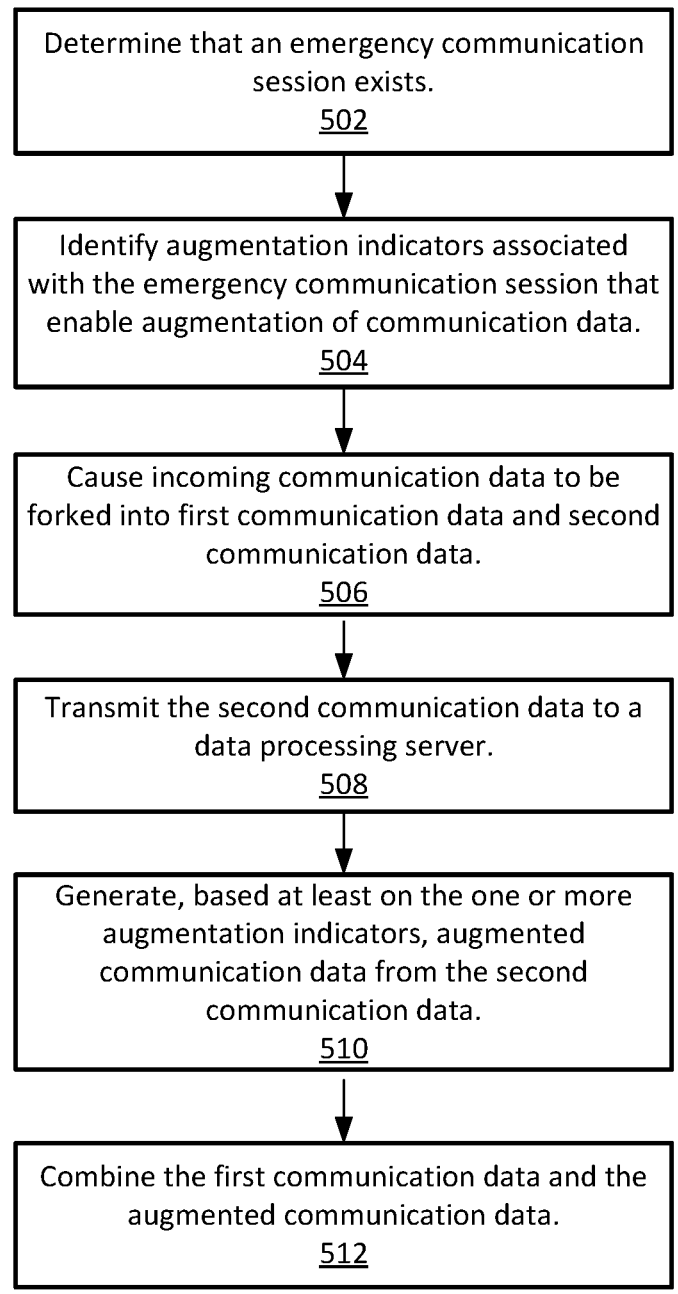
FIG. 5 is a flowchart describing a method for generating augmented communication data for an ongoing emergency communication session in substantially real time and in parallel to the processing of the original communication data.

FIGS. 4 and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel (or omitted) to implement the processes.

FIG. 4 is a flowchart describing a method for generating translated text communication data and/or translated audio communication data for an ongoing emergency communication session in substantially real time. In particular, the examples described by FIG. 4 include methods for forking communication data generated by a user device and processing the forked communication data such that first communication data can be utilized to generate translation data that is combined (or used to replace) second communication data that is processed normally by the network core.

At block 402, a network core can be configured to determine that an emergency communication session has been established between a user device and a PSAP. As noted above, the emergency session can be user device initiated or PSAP initiated, such as in the event where a callback is occurring. Additionally, the network core can flag the emergency communication session so that communication data transmitted via the emergency communication session utilizes the correct procedures for ensuring effective communication between the user device and the PSAP. In some examples, a user profile associated with the user device can be identified and associated with the emergency communication session. In some additional examples, a PSAP profile can be associated with the PSAP can be identified and associated with the emergency communication session. Additionally, the PSAP profile can be further associated with the PSAP operator that the user device is currently connected with or associated with the PSAP generally.

In some examples, the user profile can include user information that has been collected by the network core over time from a plurality of previous communication sessions associated with the user device and device information that has been submitted by the user to the communication network and/or is provided by the user device to the communication network. The device information can include internal device settings (e.g., preferred language settings, languages associated with internal applications, etc.), user submitted information, and other information stored by the user device. Additionally, the user information can be information that has been aggregated and analyzed by internal algorithms associated with the communication network. For example, machine learning algorithms can be associated with voice recognition algorithms, translation algorithms, recordings of spoken language associated with the user, and other information that is transmitted via the communication network. Additionally, the machine learning algorithms can be configured to parse the user information to identify individual nuances associated with terminology, accent, colloquialisms, idioms, and other linguistic characteristics of the user. Accordingly, the machine learning algorithm can be configured to generate and associate information regarding the processing of spoken language generated by the user and recorded by the user device so that the spoken words of the user can be more accurately translated into text or into another language.

In some additional examples, the PSAP profile can include PSAP information and/or PSAP operator information that has been submitted to the communication network. The PSAP information can include standard language(s) spoken by all or a substantial majority of PSAP operators associated with the PSAP. Additionally, the PSAP operator information can include information that describes any additional languages spoken and/or understood by the PSAP operator and a fluency associated with additional languages. In some examples, the PSAP operator information can include additional information that has been aggregated and analyzed by internal algorithms associated with the communication network regarding the speech of the operator. For example, and similar to the above discussion, machine learning algorithms can be associated with voice recognition algorithms, translation algorithms, recordings of spoken language associated with the PSAP operator, and other information that is transmitted via the communication network.

Additionally, the machine learning algorithms can be configured to parse the PSAP operator information to identify individual nuances associated with terminology, accent, colloquialisms, idioms, and other linguistic characteristics of the user. Accordingly, the machine learning algorithm can be configured to generate and associate information regarding the processing of spoken language generated by the user and recorded by the user device so that the spoken words of the user can be more accurately translated into text or into another language. Further, in scenarios where the language spoken by the user causes them to be paired with a specific operator, the fluency of the operator in the language can be utilized in combination with the linguistic nuances identified by the machine learning algorithm in order to generate text communication data for ensuring that the PSAP operator and the user are able to effectively communicate.

At block 404, network core can determine that the user device is associated with a first language and the PSAP is associated with a second language. In particular, the network core can be configured to receive initial communication data from the user device (or the PSAP) and/or an indication that the user is associated with the first language based at least on the user profile. Additionally, the network core can be configured to receive an initial response from the PSAP (or the user device) and/or an indication that the PSAP is associated with the second language based at least on the PSAP profile. Further, the network core can utilize a language recognition algorithm, a voice recognition algorithm, a language database, and/or a language recognition service to determine that the first language is associated with the user device and the second language is associated with the PSAP.

In some examples, the network core can determine that the user device is associated with a first communication data type and the PSAP is associated with a second communication data type. In particular, the network core can be configured to receive initial communication data from the user device (or the PSAP) and/or an indication that the communication data received from the user device (or the PSAP) is to be utilized to generated transcribed communication data. Additionally, the network core can be configured to receive an initial response from the PSAP (or the user device) and/or an indication that the communication response data received from the PSAP (or the user device) is to be utilized to generate transcribed communication response data. Further, the network core can utilize a language recognition algorithm, a voice recognition algorithm, a transcription database, and/or a video parsing service to generate transcribed communication data from the communication data. It should be noted that transcribed communication data can be augmented communication data, generated from the communication data, that is associated with a different data type than the data type of the communication data. For example, audio communication data can be transcribed to generate text communication data and video communication data can be transcribed to generate audio communication data.

At block 406, the network core can receive first communication data from the user device (or the PSAP). Alternatively, or in addition, an access network associated with the network core can receive the first communication data and transmit the first communication data from the user device to the network core. In particular, the user device (or the PSAP) can obtain the first communication data (e.g., audio communication data, video communication data, text communication data, etc.) from the user and transmit the first communication data, via the emergency communication session, to the network core for transmission to the PSAP (or the user).

At block 408, the first communication data can be split, forked, copied, or otherwise duplicated such that a first data packet is transmitted to a data processing server and a second data packet is processed for transmission to the PSAP (or user device). In particular, the network core can be configured to determine that augmented data is to be generated for the emergency communication session. As noted above, the communication data fork can be determined based on different languages being associated with the user device and the PSAP, based on QoS indicators than cause the network core to request lighter communication data (e.g., communication data that requires let bandwidth for transmission, less transcoding resources, less communication network resources etc.) for the emergency communication session, and/or based on communication quality indicators (e.g., the user is in a noisy environment and subtitles would assist the PSAP operator in understanding the user). Accordingly, the network core can cause at least a first data packet, potentially associated with a first data stream, to be transmitted to the translation service (e.g., a data processing server) and at least a second data packet, potentially associated with a second data stream, to be transmitted to the PSAP via standard network core procedures.

At block 410, the translation service (e.g., the data processing server) can be configured to generate, from the first communication data, second communication data that has been translated from the first language to the second language. As noted above, with reference to FIGS. 1-3, the translation service can use one or more algorithms and/or services to perform voice recognition, word analysis, and transcription to generate a sequence of words from audio data and/or video data of the first communication data. Additionally, the translation service can utilize linguistic features of the user identified by the machine learning algorithm discussed at block 402 to assist in analyzing the first communication data. In particular, the linguistic features stored by the user profile can include a language dialect associated with the user, colloquialisms/idioms utilized by the user, an accent of the user (e.g., different phonetic pronunciations for words and syllables, such as the differences between spoken General American English and British English), and other features that can assist voice recognition algorithms and STT algorithms during analysis of spoken audio.

In some examples of FIG. 4, the translation service can be replaced or supplemented by a transcription service/server configured to generate, from the first communication data, second communication data that has been transcribed from a first communication data type to a second communication data type. As noted above, with reference to FIGS. 1-3, the translation service can use one or more algorithms and/or services to perform voice recognition, word analysis, and transcription to generate a sequence of words from audio data and/or video data of the first communication data. Similarly, the transcription server can utilize the one or more algorithms and/or services to perform similar functions and generate the second communication data that has been transcribed from the first communication data. Additionally, the transcription service can utilize linguistic features of the user identified by the machine learning algorithm discussed at block 402 to assist in analyzing the first communication data. In particular, the linguistic features stored by the user profile can include a language dialect associated with the user, colloquialisms/idioms utilized by the user, an accent of the user (e.g., different phonetic pronunciations for words and syllables, such as the differences between spoken General American English and British English), and other features that can assist voice recognition algorithms and STT algorithms during analysis of spoken audio.

In some examples, the translation service can be configured to generate translated subtitles that can be recombined with the first communication data such that the audio data and/or video data is accompanied by subtitles that are displayed on the screen of a PSAP operator device (or on a screen of the user device). In particular, the subtitles can be displayed via a GUI such that the words appear on the screen in the second language at approximately the same time as the user speaks the words in the first language or at least in association with words in the first language. It should be noted that due syntax differences between the first language and the second language, the subtitles can be displayed as they are generated and transmitted by the translation service, can be displayed in individual statements, or otherwise organized so that the PSAP operator (or user) is capable of understanding an approximation of what the user (or the PSAP operator) is saying.

It should be noted that while the translation service attempts to perfectly translate between the first language and the second language, not all statements in the first language may translate effectively to the second language (e.g., due to the second language not having a word or phrase that effectively communicates the meaning of the word in the first language). Accordingly, the translation service may insert a text representation of non-translatable words and phrases from the first language into the sentence structure of the second language. Alternatively, or in addition, the translation service can insert an approximation of the word or phrase from the first language in the second language. For example, the translation service can identify an idiom in the first language from the first communication data and translate the idiom into a literal phrase in the second language, optionally according to information stored in the user profile identified by the network core.

In some additional examples, the translation service can be configured to generate translated audio data that can be recombined with the first communication data such that text data and/or video data generated by the user device is accompanied by generated speech in the second language. In particular, the translated audio data can be output by the PSAP (or the user device) in addition to the first communication data generated by the user device (or the PSAP) and/or in place of audio data in the first language. Additionally, the translated audio data can comprise computer generated speech that is generated from translated text data and/or translation data generated by the translation engine.

In some further examples, and independent of whether translated text data and/or translated audio data is generated, the data processing server can generate second communication data based at least on the first communication data. In particular, the second communication data can be generated by the data processing server that is associated with at least one of the access network and/or the network core. For example, the data processing server can comprise network edge computing resources, user device computing resources, distributed cloud computing resources, and/or other resources capable of generating the second communication data in parallel with the processing of the first communication data by the communication network. Accordingly, the second communication data can be generated by the data processing server in substantially real time for combination, replacement, augmentation, or other supplementary actions with the first communication data.

At blocks 412 and 414, the translation service can transmit the second communication data to the network core. In particular, the second communication data can be transmitted in association with the emergency communication session and cause the network core to combine the second data packets associated with the first communication data and the second communication data. Additionally, it should be noted that the second communication data can be generated in real time and in parallel with the first communication data. Further, the second communication data can be generated in real time based at least in part on network edge computing resources, device based computing resources, cloud resources that are distributed within the network core, or other resources that are configured to receive the first communication data, generate the second communication data, and the transmit the second communication data in parallel with the first communication data such that the network core can combine, substitute, replace, or otherwise merge the first communication data and the second communication data before transmission to the PSAP (or the user device).

FIG. 5 is a flowchart describing a method for generating augmented communication data for an ongoing emergency communication session in substantially real time and in parallel to the processing of the original communication data. In particular, the examples described by FIG. 4 include methods for forking communication data generated by a user device and processing the forked communication data such that first communication data can be utilized to generate translation data that is combined (or used to replace) second communication data that is processed normally by the network core.

At block 502, the network core (or a network node of the network core) can determine that an emergency communication session has been established between a user device and a PSAP. In particular, a plurality of communication session can be established and maintained by the communication network. However, not every communication session of the plurality of communication sessions will have the described techniques applied to the communication data. Additionally, while the communication network may be configured to automatically provide translation and transcription for emergency communication sessions, such capabilities may be opt in/elected by standard communication sessions. Accordingly, the communication can determine that an emergency communication session exists between the user device and the PSAP and determine that augmentation processes are to be applied to communication data transmitted via the emergency communication session.

At block 504, the network core (or network node of the network core) can identify one or more augmentation indicators that are associated with the emergency communication session and enable augmentation of the communication data. In particular, the augmentation indicators can be representative of individual scenarios where communication data from the emergency communication session would be transmitted to a data processing server for the purpose of generating augmented communication data. Additionally, the network core can monitor the emergency communication session during the transmission of communication session to determine whether augmentation indicators manifest during the emergency communication session.

In some examples, a first augmentation indicator can be that the user associated with the user device and the PSAP operator associated with the PSAP speak different languages. In particular, the network core can determine that the user is speaking or understands a first language while the PSAP operator is speaking or understands a second language. Additionally, the network core can determine that the user and the PSAP operator are speaking the first language and/or the second language based on at least one of a user profile that associates the user with one or more languages, a PSAP profile that associates the PSAP/the PSAP operator with one or more different languages, the communication data generated by the user device is associated with the first language, the communication data generated by the PSAP is associated with the second language, and/or other determinations that the user and the PSAP operator may not be able to understand each other. Further, and as an extension of the determination that the user and the PSAP may have difficulty understanding each other due to linguistic differences, the network core may determine that augmented communication data is to be generated based at least on an accent and/or dialect associated with the user that is different from the accent/dialect associated with the PSAP operator. For example, in Germany, there are several dialects of the German language that may have communication difficulties. Similarly, in the United States there are several accents that may cause individuals to experience communication difficulties. Accordingly, these differences in accent and/or dialect may cause the network core to identify an augmentation indicator and cause augmented communication data to be generated.

In some additional examples, a second augmentation indicator can be that Quality of Service (QoS) indictors satisfy one or more QoS thresholds indicating that augmented communication data is to be provided for the emergency communication session. In particular, the QoS indicators can be utilized by the network core to monitor the quality of communication sessions that are currently maintained by the communication network. This can include indicators related to latency, packet loss, jitters in communication data, bandwidth availability, transcoding resources consumed, and other indicators of communication session quality. Additionally, when these indicators satisfy a threshold (e.g., exceed a packet loss threshold or fall below a bandwidth availability threshold), the network core can be configured to determine that information transfer via the emergency communication session may be ineffective. Accordingly, to mitigate information transfer issues, the network core can cause augmented communication data to be generated and cause the emergency communication session to utilize communication methods that utilize fewer communication network resources.

In some further examples, a third augmentation indicator can be that communication data generated by the user includes excessive ambient noise or other features that may inhibit communication between the user and the PSAP operator. Accordingly, the network core can cause augmented communication data, such as subtitles, to be generated and provided for the emergency communication session.

At block 510, the data processing server can generate augmented communication data from the second communication data. In particular, the data processing server can generate the augmented communication data based at least in part on the one or more augmentation indicators. Additionally, it should be noted that the data processing server can generate the augmented communication data in any manner discussed previously in relation to FIGS. 1-4. However, the above methods for generating augmented communication data can be triggered by the one or more augmentation indicators. For example, the communication network can determine that the user and the PSAP operator are associated with different languages and determine that the first augmentation indicator above applies to the emergency communication session. Further, the augmentation indicator can be transmitted by the network core to the data processing server and cause the second communication data to be utilized to generate augmented communication data based at least on the augmentation indicator. Additionally, the augmentation indicator may change during the emergency communication session due to the user no longer being able to receive audible communication data (e.g., the user needs to hide during an emergency). Accordingly, the network core can transmit the new augmentation indicator that audio data is to be converted into text data in place of or in addition to the augmentation indicator that audio data is to be translated for the user and the PSAP operator.

At block 506, the network core can cause incoming communication data to be forked into first communication data and second communication data. At block 508, the second communication data can be transmitted to a data processing server. At block 512, the network core can combine the first communication data and the augmented communication data. It should be noted that these steps have been described above at least by FIGS. 1-4. Accordingly, the steps described by blocks 506, 508, and 512 can be performed in a manner similar to that described above by FIGS. 1-4.

Figure 6:
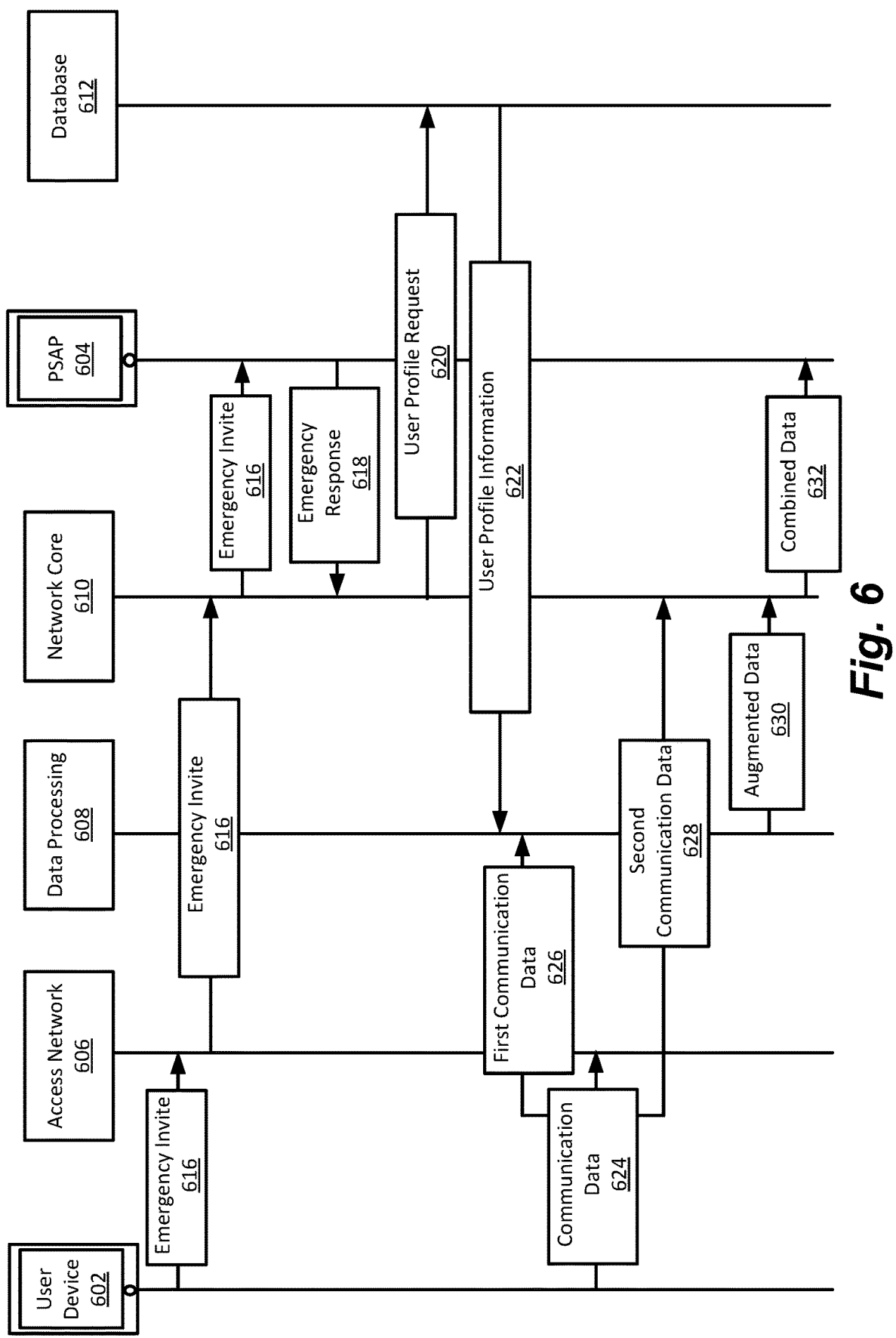
FIG. 6 is a timing diagram for establishing a connection between a user device and a PSAP, determining that augmented communication data is to be provided for the connection, and generating the augmented communication data.

FIG. 6 is a timing diagram for establishing a connection between a user device and a P SAP, determining that augmented communication data is to be provided for the connection, and generating the augmented communication data. It should be noted that while FIG. 6 displays a timing diagram for handing communication for an emergency session within the communication network. It should be noted that individual network nodes can be modified to represent communication over an Internet-based communication network. In particular, a first user device 602 can initiate a communication with a PSAP 604 through an Access Network 606 that can be configured to transmit the communication to a data processing server 608 and the network core 610. In some examples, a database 612 can be associated with the emergency communication session and/or the data processing server 608.

At blocks 616, the user device 602 can transmit an emergency communication session invite to the PSAP 604. In particular, a user associated with the user device 602 can cause the user device 602 to generate the emergency communication session invite by dialing an emergency number (e.g., 911). The user device 602 can generate and transmit the emergency communication session invite to an access network 606, through the network core 610, and ultimately to the PSAP 604. Additionally, at block 618, the PSAP 604 can transmit an emergency response back to the network core 610. The emergency response will generally by an emergency communication session accept message, but in some examples, can include a reject message. For example, the PSAP 604 could be overloaded with emergency communication sessions (such as during a large scale disaster). In at least one example, the emergency communication session invite can be stored despite the reject message and a callback initiated with the user device 602 when the PSAP 604 determines that a PSAP operator has become available.

At block 620, the network core 610 can request that user profile information be transmitted to the data processing server 608 in response to the establishment of the emergency communication session. It should be noted that while the user profile request can be transmitted at other points in the emergency communication session (e.g., determination of augmentation indicators as described by at least FIG. 5), user profile information can be provided to the data processing server 608 independent of whether augmented data will be provided for the emergency communication session. Accordingly, at block 622, the database 612 can respond with user profile information that is transmitted to the data processing server 608.

At block 624, and as a part of the emergency communication session, the user device 602 can generate communication data and transmit the communication data to the access network 606. Additionally, at blocks 626 and 628, the access network can split the communication data into the first communication data that is sent to the data processing server 608 and second communication data 628 that is sent to the network core 610.

In some examples, the data processing server 608 can be configured to analyze the first communication data and/or the user profile information independent of generating augmented communication data. In particular, the data processing server 608 can be configured to determine whether augmented communication data is to be generated for the emergency communication session (e.g., identify the one or more augmentation indicators discussed above by FIG. 5). Additionally, the data processing server 608 can identify a difference in spoken language based on text data, audio data, and/or video data associated with the first communication data and/or the user profile information received from the database 612. Further, the data processing server 608 can be configured to determine whether the first communication data include excess ambient noise, numerous speaking individuals, indicators that the user cannot or desires not to speak, and other communication data features that can indicate augmented communication data is to be generated.

In some additional examples, the network core 610 can be configured to analyze the second communication data independently of or in combination with the data processing server 608 analyzing the first communication data. In particular, the network core 610 can be configured to utilize one or more network nodes to determine whether QoS indicators or other augmentation indicators associated with the second communication data satisfy one or more augmentation thresholds. Additionally, the network core 610 can coordinate with the data processing server 608 based on determinations made based on the first communication data and/or the second communication data to determine augmentation data to be produced for the emergency communication session.

At block 630, the data processing server can be configured to generate the augmented data from the first communication data and transmit the augmented data to the network core 610. The network core 610 can be configured to receive the augmented data and, at block 632, generate combined data 632 that is comprised of at least one of the augmented data and the second communication data. In particular, the augmented data can be utilized by the network core 610 as a supplement to the second communication data, a replacement for some or all of the second communication data, or an addition to the second communication data to ensure effective communication between the user device 602 and the PSAP 604.

Figure 7:
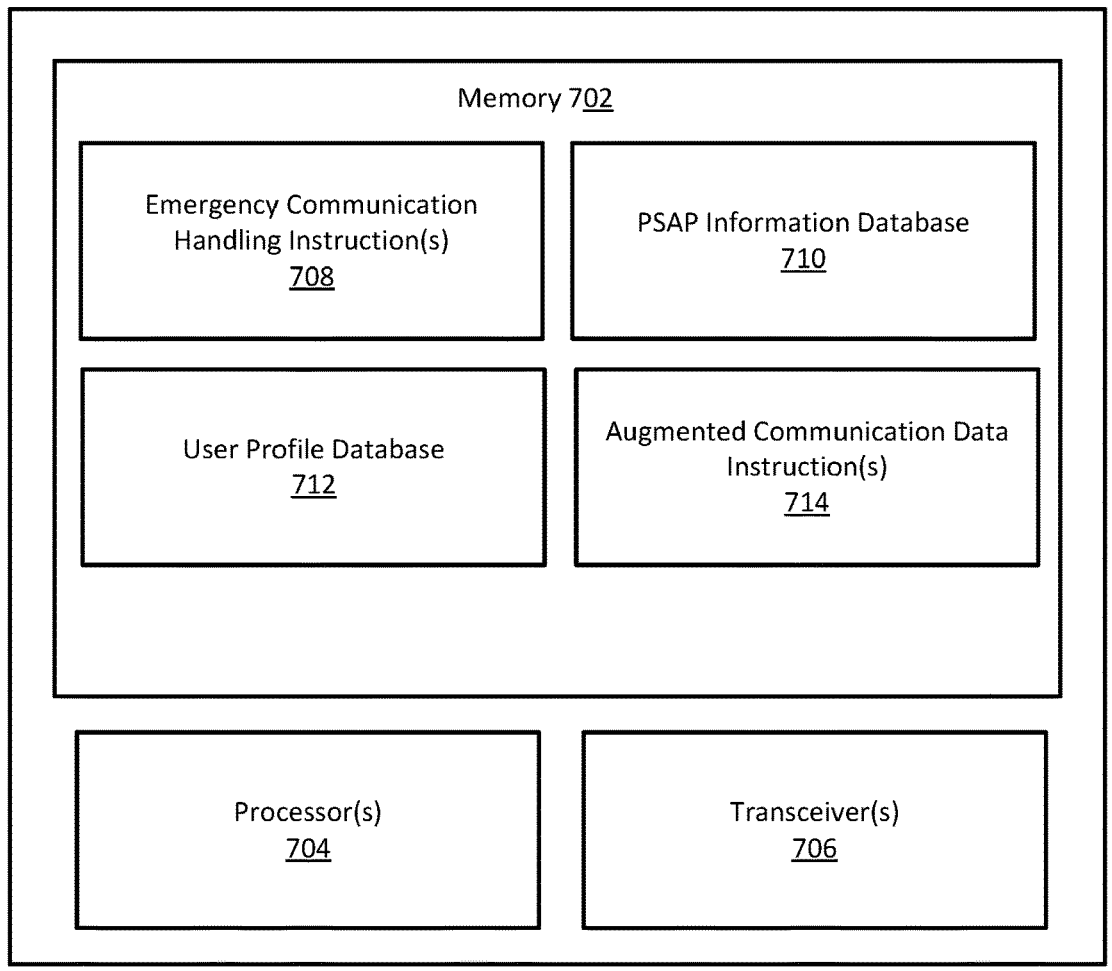
FIG. 7 is a block diagram of a control function capable of implementing the methods disclosed herein, in accordance with some examples of the present disclosure.

FIG. 7 illustrates a block diagram of a control function capable of implementing the methods disclosed herein, in accordance with some examples of the present disclosure. In some examples, control function 700 is can correspond to any of the control functions, network nodes, and/or processing servers discussed in FIGS. 1-6. As illustrated, control function 700 is generally comprised of memory 702, one or more processors 704, and one or more transceivers 706.

In some examples, memory 702 is volatile (such as RAM), non-volatile (such as ROM, flash memory, etc.) or some combination of the two. Memory 702 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that can be accessed by control function 700. Memory 702 can comprise one or more emergency communication handling instructions 708 that are executed by processors 704 and cause processors 704 to perform operations of the methods discussed above. Further, memory 702 can comprise additional modules that can be executed by processors 704 and cause processors 704 to perform additional operations associated with control function 700. The additional modules can comprise a PSAP information database 710, a user profile database 712, augmented communication data instruction(s) 714, and other network modules.

In some examples, processors 704 can include one or more central processing units (CPUs), one or more graphics processing units (GPUs), both CPUs and GPUs, or other processing units or components known in the art.

In some examples, transceivers 706 can include one or more wired or wireless transceivers. For example, transceivers 706 can include a network interface card, a network adapter, a LAN adapter, an address associated with a network connection, or another device permitting communications to be sent and received. Additionally, transceivers 706 can comprise any wireless transceiver capable of engaging in wireless, radio frequency (RF) communication. Further, transceivers 706 can include additional wireless modems, such as Wi-Fi, WiMax, Bluetooth, and/or infrared communication modems.

In some additional examples, transceivers 706 can be configured to transmit communications via Internet-based communication networks, 3G networks, 4G networks, 5G network, and other communication networks. Internet-based communication networks can include networks that utilize the Internet of Things, provided by Internet Service Providers, that interconnect various user devices and enable signals to be freely transmitted between the various user devices. Additionally, Universal Mobile Telecommunication Systems (UMTS) is an example of a 3G network, although there are other 3G network infrastructures that may implement the following methods and systems. Long Term Evolution (LTE) and Evolved High-Speed Packet Access (HSPA+) are examples of 4G networks, although there are other 4G network infrastructures that may implement the following methods and systems. 5G networks are the next generation of mobile networks that are designed to combine both an evolution and revolution of the existing LTE/LTE-A mobile networks.

In some examples, the emergency communication handling instructions 708 can cause processors 704 and transceivers 706 to perform operations that comprise the methods discussed above. These operations include, but are not limited to, initiating an emergency communication session per a user device request, transmitting communication data (e.g., augmented communication data, user generated communication data, PSAP operator generated communication data, etc.), storing information for PSAP callback operations, securing communication information associated with the emergency communication session, and/or monitoring emergency communication sessions, as described with respect to FIGS. 1-7.

In some examples, a PSAP information database 710 can comprise communication information submitted by a PSAP, information generated by a PSAP operator, and/or information determined by internal network algorithms associated with the PSAP and/or the PSAP operator. In particular, the information can be stored in associated with a PSAP identifier (ID) and/or a PSAP operator ID that enables PSAP information to be requested from the PSAP information database 710 for generating augmented communication data for the emergency communication session.

In some examples, a user profile database 712 can comprise user profile information secured by a unique ID associated with a user profile. In particular, the user profile database 712 can store user profile information including contact information, contact aliases for a user associated with the user profile (e.g., email addresses, alternative phone numbers, etc. associated with the user), subscription plans associated with the user profile, and other information related to the user and the user profile. Additionally, the user profile database 712 can store the user profile information in association with the unique ID associated with the user profile such that a user device can access the user profile information based at least on a valid user profile login on the user device and the unique ID associated with the user device and the unique ID associated with the user profile database 712 matching.

In some additional examples, the user profile database 712 can include user profile information submitted by the user device, information generated by a user associated with the user device, and/or information determined by an internal algorithm associated with the communication network. In particular, the user profile database 712 can include user accent profiles, user dialect profiles, user language profiles, and other information that is specific to the user and tracked by the communication network to ensure that high quality translations and transcriptions can be generated for the user during at least emergency communication sessions. The various linguistic profiles generated for the user can be updated, continuously, aperiodically, periodically, and/or in response to triggers. These profiles can then be utilized during voice recognition of the voice of the user, during STT analysis of the voice of the user, and in generating translations and transcriptions for the user.

In some examples, augmented communication data instructions can comprise rules, guidelines, and thresholds for determining when augmented communication data is to be generated, what augmented communication data is to be generated by the data processing server, and monitoring the communication data associated with the emergency communication session. As described above by FIGS. 1-6, the communication network can be configured to determine that augmented communication data is to be generated for the emergency communication session. Accordingly, the augmented communication data instructions can be configured to define the augmented data thresholds, monitor QoS indicators for the emergency communication session, and determine what augmented data is to be provided for the emergency communication session.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
a memory that includes one or more computer-executable instructions that cause the processors to perform operations comprising:
determining, based at least on a communication session, that a first user device is associated with a first user profile and a second user device is associated with a public safety answering point (PSAP);
determining, based at least on the first user profile, that audio data associated with the communication session is to be translated from a first language associated with the first user profile to a second language associated with the PSAP;
transmitting, to a translation server associated with the communication session, translation data associated with the first user profile;
translating, based at least on the translation data, the audio data from the first language to the second language; and
transmitting the audio data from the translation server to the second user device.

2. The system of claim 1, the operations further comprising:
determining, based at least on the audio data associated with the communication session, that a transcription of the audio data is to be generated by a transcription server;
transmitting the audio data to the transcription server associated with the communication session; and
causing the transcription server to generate text communication data from the audio data.

3. The system of claim 1, wherein:
the audio data is received in associated with the communication session from the first user device; and
the audio data is included as communication data associated with the communication session, wherein the communication data further comprises video data received from the first user device.

4. The system of claim 3, the operations further comprising:
receiving, from the PSAP, additional communication data associated with the communication session, wherein the addition communication data includes at least additional audio data;
translating the additional audio data from the second language to the first language; and
transmitting the additional audio data from the translation server to the first user device.

5. The system of claim 1, wherein translating the audio data from the first language to the second language further comprises:
duplicating the audio data to create first audio data and second audio data;
transmitting, to the translation server, the second audio data; and
causing the translation server to generate augmented audio data, wherein the augmented audio data includes at least one of translated subtitles for the second audio data or translated audio data associated with the second audio data.

6. The system of claim 5, wherein transmitting the audio data from the translation server to the second user device further comprises:
- receiving the augmented audio data from the translation server;
- determining, based at least on the first audio data and the second audio data, finalized communication data that includes at least the augmented audio data; and
- transmitting, to the second user device, the finalized communication data.

7. The system of claim 1, wherein the translation server is at least one of:
- local computing resources associated with the first user device;
- network edge computing resources associated with an access network of the communication session; or
- cloud computing resources associated with and distributed within a communication network of the communication session.

8. The system of claim 1, wherein:
- the first user profile comprises speech parameters and accent data generated by a machine learning algorithm of the translation server, the speech parameters and the accent data generated based at least on historical first user data; and
- translating the audio data from the first language to the second language comprises utilizing the speech parameters and the accent data to analyze the audio data received from the first user device.

\* \* \* \* \*